(No Model.)  G. H. REYNOLDS.  6 Sheets—Sheet 1.
ELECTRIC ELEVATOR.

No. 538,700. Patented May 7, 1895.

WITNESSES
F. Clough.
C. J. Shipley

INVENTOR
Geo. H. Reynolds

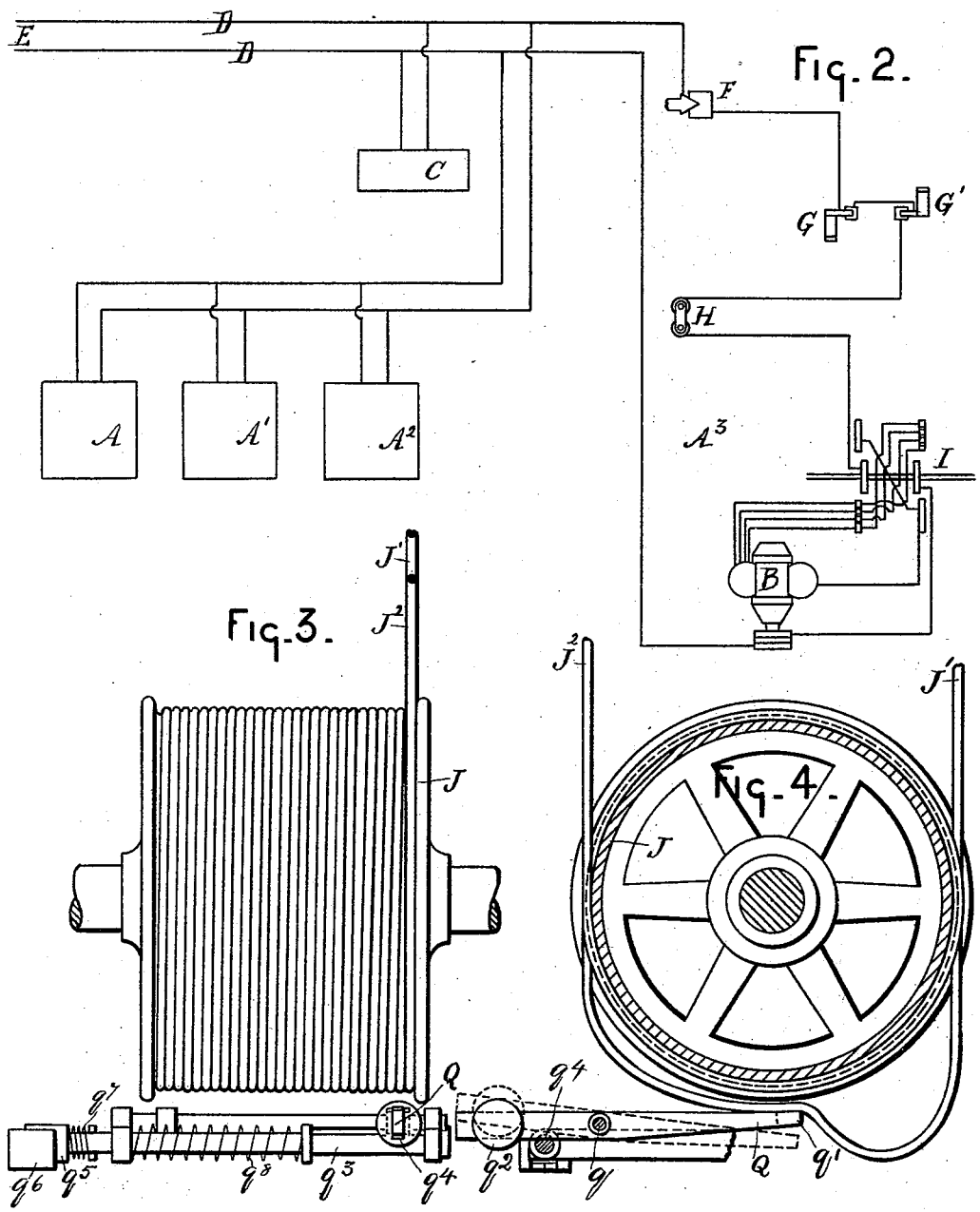

(No Model.) 6 Sheets—Sheet 3.
G. H. REYNOLDS.
ELECTRIC ELEVATOR.

No. 538,700. Patented May 7, 1895.

WITNESSES
F. Clough.
C. J. Shipley

INVENTOR
Geo. H. Reynolds (No Model.) 6 Sheets—Sheet 4.

G. H. REYNOLDS.
ELECTRIC ELEVATOR.

No. 538,700. Patented May 7, 1895.

WITNESSES
F. Clough
C. J. Shipley

INVENTOR
Geo H. Reynolds (No Model.) 6 Sheets—Sheet 5.
G. H. REYNOLDS.
ELECTRIC ELEVATOR.
No. 538,700. Patented May 7, 1895.
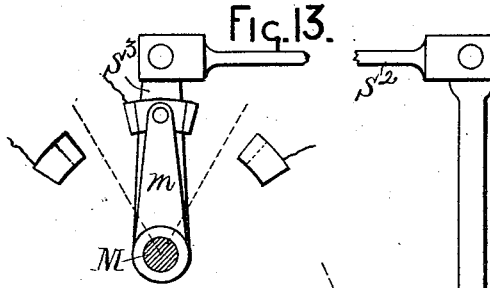
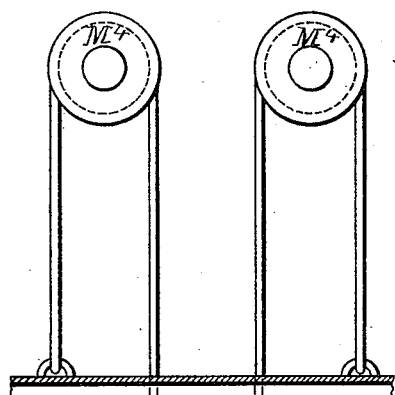
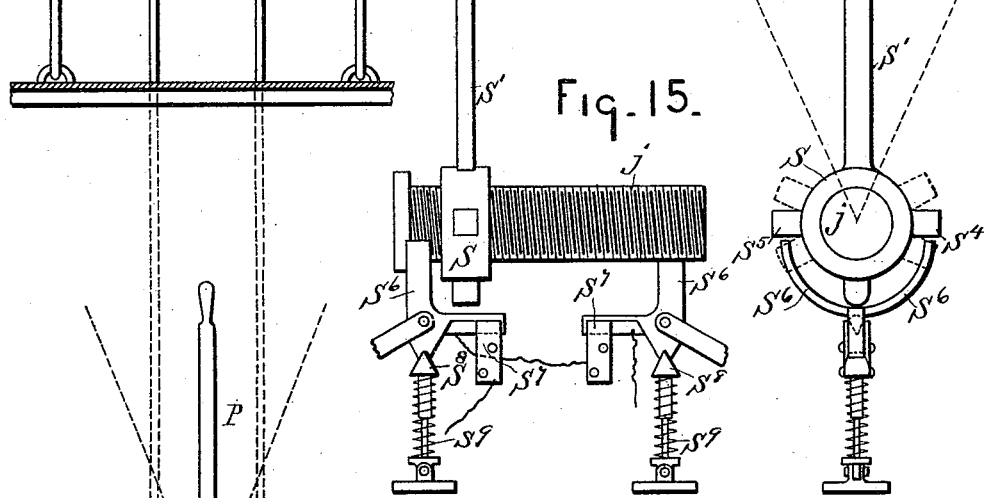
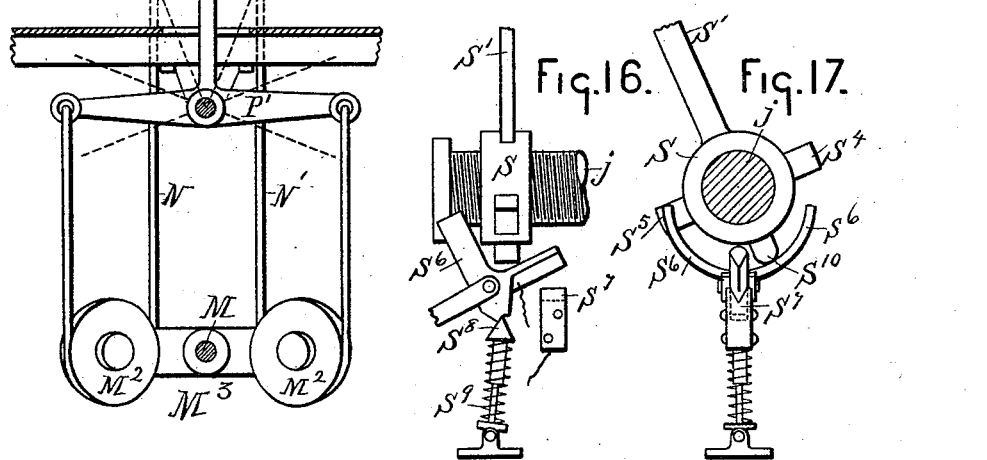
WITNESSES
F. Clough
C. J. Shipley
INVENTOR
Geo. H. Reynolds (No Model.) 6 Sheets—Sheet 6.
G. H. REYNOLDS.
ELECTRIC ELEVATOR.
No. 538,700. Patented May 7, 1895.
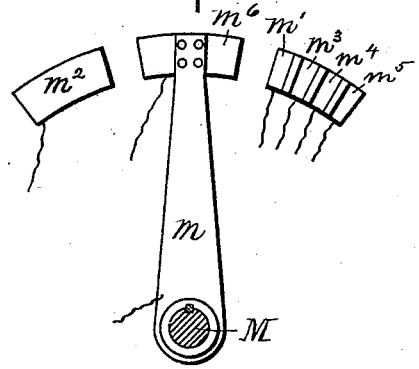
Fig. 18.
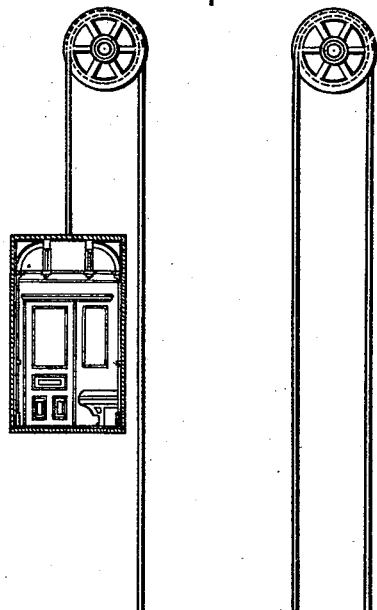
Fig. 20.
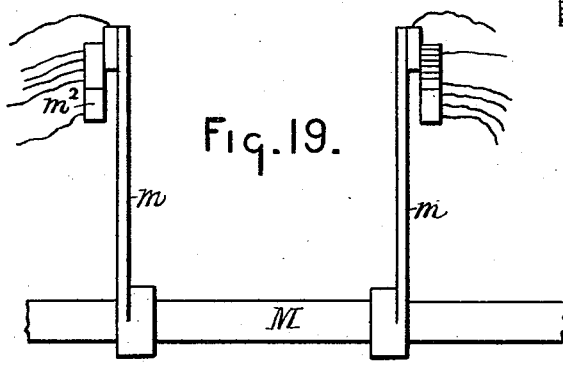
Fig. 19.
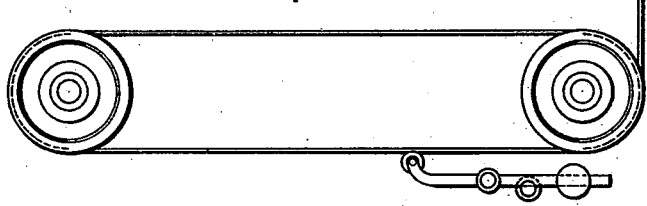
Fig. 21.
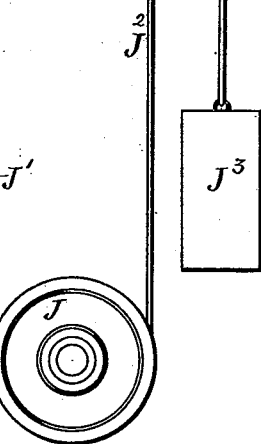
WITNESSES
F. Clough.
C. J. Shipley
INVENTOR
Geo H. Reynolds
THE NORRIS PETERS CO., PHOTO-LITHO., WASHINGTON, D. C.

UNITED STATES PATENT OFFICE.

GEORGE H. REYNOLDS, OF NEW YORK, N. Y., ASSIGNOR, BY MESNE ASSIGNMENTS, TO THE NATIONAL COMPANY, OF CHICAGO, ILLINOIS.

ELECTRIC ELEVATOR.

SPECIFICATION forming part of Letters Patent No. 538,700, dated May 7, 1895.

Application filed January 27, 1890. Serial No. 338,270. (No model.)

*To all whom it may concern:*

Be it known that I, GEORGE H. REYNOLDS, a citizen of the United States, residing at New York, county of New York, State of New York, have invented a certain new and useful Improvement in Electric Elevators; and I declare the following to be a full, clear, and exact description of the invention, such as will enable others skilled in the art to which it pertains to make and use the same, reference being had to the accompanying drawings, which form a part of this specification.

Figure 1:
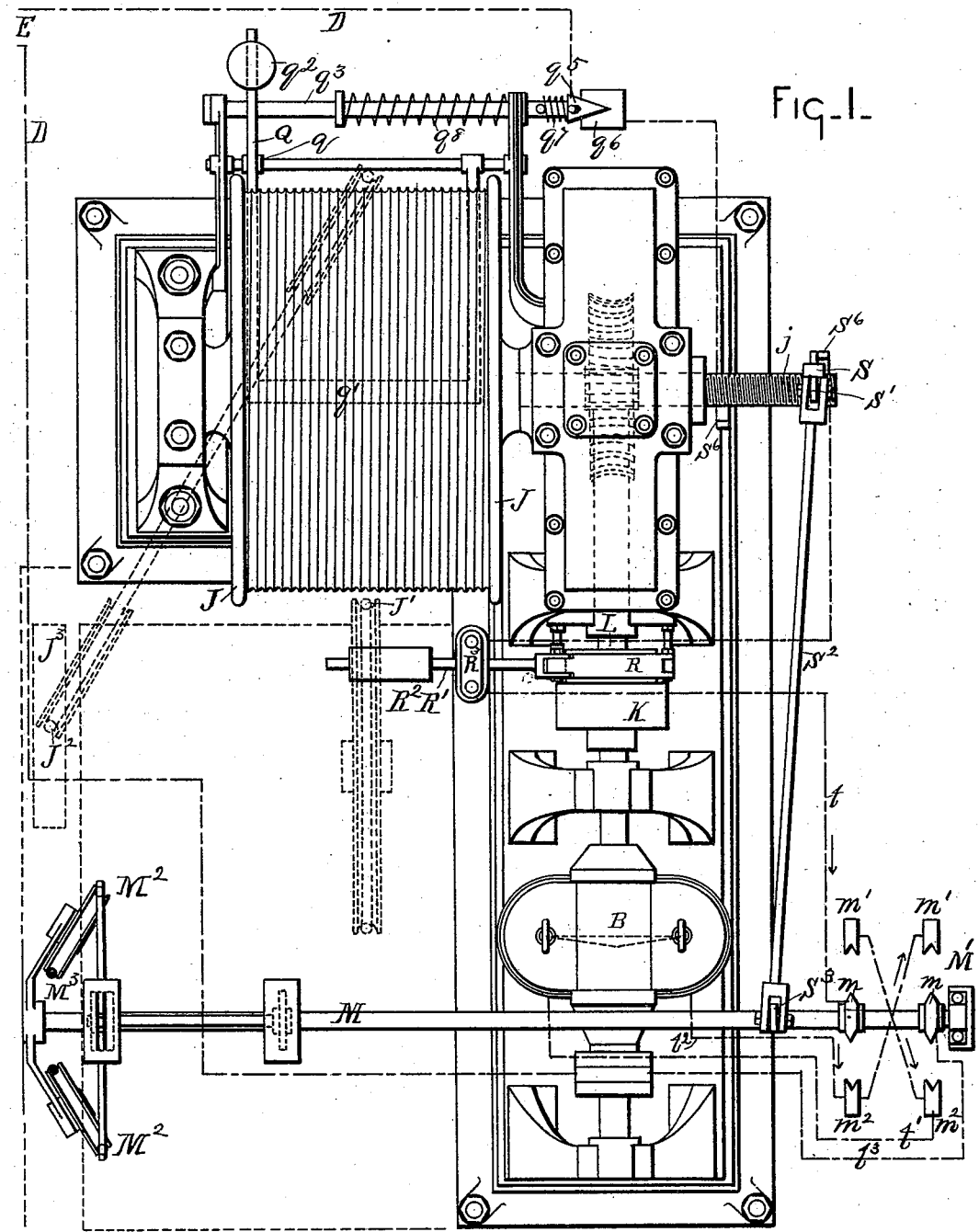
Figure 5:
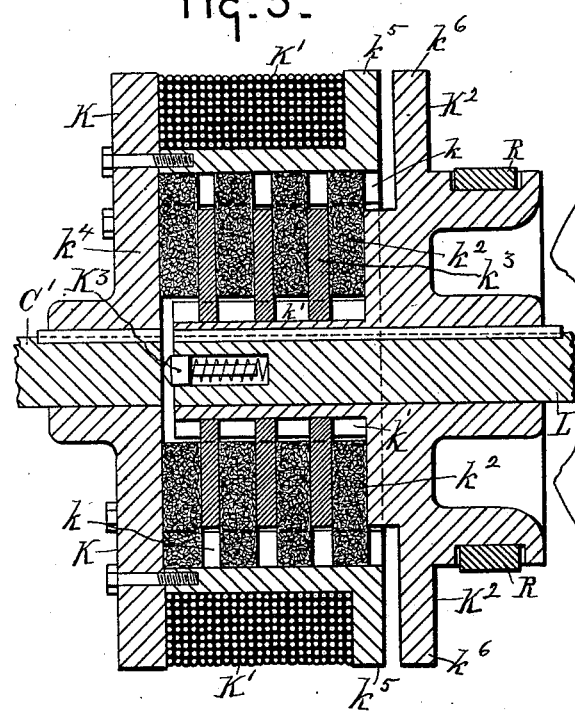
Figure 6:
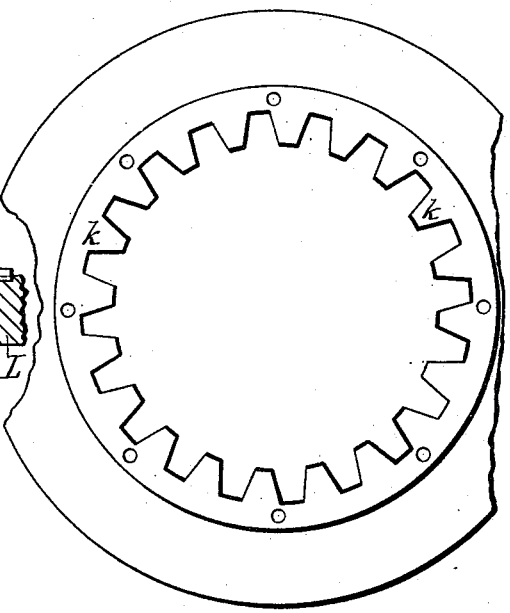
Figure 7:
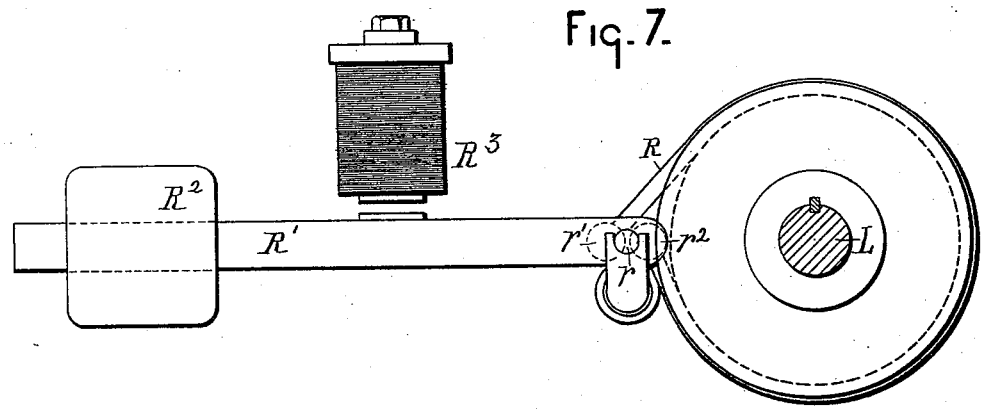
Figure 8:
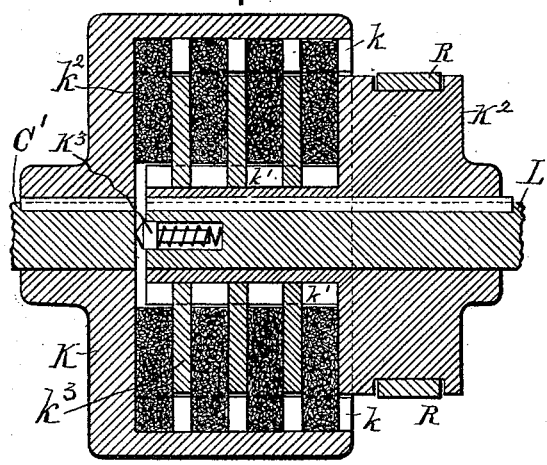
Figure 9:
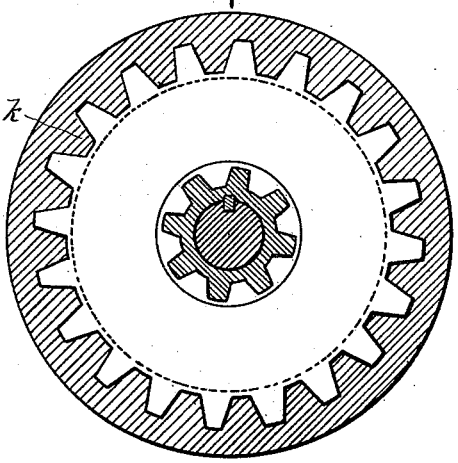
Figure 10:
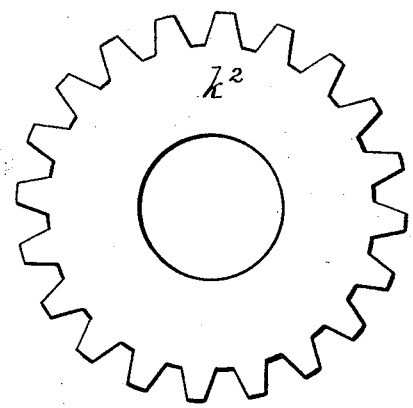
Figure 11:
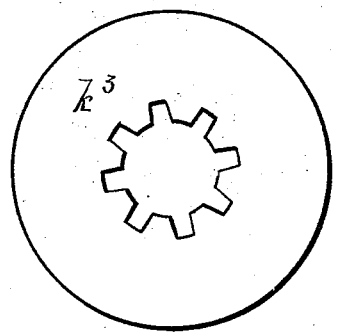

In the drawings, Figure 1 is a plan view of the hoisting mechanism for an elevator. Fig. 2 is a diagrammatic view illustrating a group of elevators receiving the current from a common generator and with an intermediate storage-battery and illustrating at the right in diagrammatic form the primary features connected with each separate elevator. Fig. 3 illustrates the winding-drum, with its cable, whereby the elevator is hoisted, and with the counterpoise-cable, adapted to wind on in the same channel where the hoisting-cable is unwound from the drum, and in connection therewith automatic mechanism for stopping the motive power in case the elevator-cab or counterweight should be accidentally stopped. Fig. 4 is an end elevation of the mechanism shown in Fig. 3. Fig. 5 is a longitudinal central section of electrical friction-clutch mechanism adapted to engage the motor. Fig. 6 is an end view of the cylinder shown in Fig. 5, upon which the wire is wound, and illustrating the cogs or inwardly-projecting corrugations along which the non-magnetic disks are adapted to slide and which hold them firmly, so as to revolve with the cylinder. Fig. 7 illustrates an electric brake mechanism whereby the motor is quickly stopped when the operative current is for any reason cut off therefrom. Fig. 8 is a view of a variation of the device shown in Figs. 5 and 6, the coils of wire not being employed therewith. Fig. 9 is a sectional view of the same, illustrating the relative positions of the disks which are connected with the cylinder. Fig. 10 is a separate view of one of the disks which are engaged with the other cylinder. Fig. 11 is a separate view of one of the disks attached to the shaft which projects into the said cylinder. Fig. 12 is a separate diagrammatic view illustrating the hand mechanism on the elevator-car for operating the electric switch mechanism at the base of the shaft. Fig. 13 illustrates the electrical switch at the bottom of the shaft, which regulates the admission of current to the motor. Fig. 14 is an end view, and Fig. 15 a side elevation, of mechanism connected with the shaft of the hoisting-drum, whereby the switch shown in Fig. 13 is shifted automatically to cut off the current when the elevator arrives at either the upper end or the lower end of the elevator-well. Fig. 16 shows said automatic mechanism in the act of disconnecting or breaking the said circuit. Fig. 17 is an end elevation of the mechanism shown in Fig. 16. Figs. 18 and 19 illustrate a switch designed to regulate the operative current admitted to the motor to conform to the load to be elevated. Fig. 20 is a diagrammatic view illustrating the elevator, the hoisting-drum, and the counterpoise-weight adapted to wind on or off from the drum as the hoisting-cable is wound off or on, respectively. Fig. 21 is a variation of the mechanism shown in Figs. 3 and 4, wherein the safety appliance there shown is adapted for connection to an elevator mechanism in which the cable, instead of being wound upon a drum, is stretched between two sets of pulley-blocks, one of which has a motion toward the other.

Heretofore where electric motors have been adapted for the operation of elevators, that is to say, where the motors have been connected with the elevator driving mechanism, it has been customary to locate one such motor contiguous to each said elevator mechanism. These have then been connected with a suitable generator, which generator has of necessity had such a capacity as would enable it to drive simultaneously all said elevator motors with their maximum loads. This has resulted in many practical difficulties, among which are the following:

First. Inasmuch as some of the elevators may at times be out of service, or not running, or any or all of them may be running with loads far below the maximum, the generating power is much greater than is proportioned to the ordinary loads that are carried.

Second. Should the generator for any reason be stopped, as, for instance, by being out of order, or through the stoppage of its driving engine or for any other reason, or should its current be cut off or interrupted or diminished, the operative current for the elevator motors would of necessity be interrupted, and the elevators could not be run.

Third. The power necessary for driving the generator could not be graduated to conform either to the actual load or to the average load, but must at all times be ready to carry a maximum load; nor was it practicable with a given load to give to the car greater or less speed, proportioning the consumption of power or energy directly to said conditions.

It is the purpose of my invention primarily to produce an electric elevator mechanism which shall overcome these and other defects, and which shall embody at the same time certain mechanical improvements in connection with the mechanism for each individual elevator. Among these mechanical improvements are the following: first, the location of a switch operating mechanism within the elevator cab, whereby the operator in the cab may manipulate the switch which governs the motor actuating current, said switch located at a fixed point separate from the car, and preferably at the top or bottom of the elevator shaft; second, the feature of manipulating the electric current from the elevator cab without permitting any of the electric conductors to be trained to or into the cab; third, the provision of mechanism whereby the car is automatically stopped at the upper or lower end of its travel by severing the electric motor circuit; fourth, the provision of mechanism whereby the operative current is immediately severed from the motor in case for any reason any hoisting cable or counterweight cable should become slackened, as, for instance, by the accidental stoppage of the car or counterweight on their downward travel; fifth, in the provision for this purpose of mechanism adjacent to the hoisting drum whereby the sag of the slackened cable will operate mechanically to actuate the switch for severing the motor circuit; sixth, in the provision of a counterweight and cable, the latter adapted to wind off from or on to the drum as the hoisting cable is wound on to or off from the same drum, or similar drum on the same shaft; seventh, the employment of a counterweight greater than the weight of the elevator cab in connection with an electric motor for operating the car, whereby a small electric motor may be employed of power sufficient to manipulate the load upon the car without the necessity of electric motive power for manipulating the weight of the car itself, and whereby I am enabled to manipulate a series of elevators upon the circuit of a single generator; eighth, the provision with an elevator of a counterweight greater than the weight of the cab, cables whereby the same may be hoisted or drawn down, and electric motor mechanism for actuating the cab in both directions; the construction being such that the motive power may operate to lift the load when the combined load and cab are in excess of the counterweight, and to draw it down whenever the combined weight of the car and its load are less than the counterweight; ninth, the provision in connection with the foregoing of a counterweight adapted to counterpoise the car and substantially one half of its maximum load in addition thereto in combination with electric motor driving mechanism; tenth, the provision in connection with an elevator of an electric motor for actuating the same, and a brake adapted to stop the driven shaft quickly whenever the current is cut off, said brake being automatically released and held in its released position by the current when the said current is passing through the motor, whereby any further movement of the elevator by the momentum given to the driven shaft may be instantly prevented; eleventh, the provision in connection with an elevator operated by an electric motor, of a friction clutch whereby the motor is engaged with the shaft to be driven, said clutch being an electrical clutch actuated by the current which drives the motor; the construction being such that the elevator operating mechanism is brought into greater frictional engagement with the motor, whereas the motor itself may acquire a considerable speed in advance of the shaft to be driven, before the said frictional clutch mechanism has been fully engaged to move therewith; twelfth, in a peculiar form of clutch wherein the frictional engagement is due to the tendency of the armature to adjust itself to its normal position within the magnetic field, the same when at rest having been shifted to a slight extent longitudinally of its shaft out of said normal position; thirteenth, the combination with the armature arranged as last explained, of a helix of wire wound upon a core connected either with the motor shaft or the shaft to be driven, in connection with an armature of iron connected with the other shaft, and located in a position to be attracted by the said magnet thus created, the same serving to increase the force with which the frictional clutch is moved into engagement; fourteenth, the provision at the base of the elevator well in connection with the electric switch operating mechanism of an arm connected with said switch pivot or shaft, and provided on either side of said pivot with pulley wheels, corresponding stationary pulley wheels at the top of the elevator well, two cables passing from the elevator up and over the said upper pulleys, thence down around the lower pulleys respectively, with their extremities connected to the rocking bar governed by a hand lever in the car, the construction being such that by operating the handle the said switch may be actuated to turn on or cut off the operative current on the motor; fifteenth, the provision in connection with an elevator driven by an electric motor, of field magnets upon the motor, wound with wires of different coils, whereby the operative current may be directed through one or more of said coils, thereby causing the electric energy expended to be proportionate to the load that is being carried by the motor, or whereby the same load may be carried at a greater or less speed by the motor, and in connection therewith hand operating mechanism within the car whereby the current may at the will of the operator be directed through one or more of said coils; sixteenth, in connection with automatic mechanism for stopping the elevator at the top and bottom of its travel by breaking or interrupting the operative current of the motor, means whereby the operator in the car by actuating his hand lever in a direction to reverse the movement of the elevator, may restore the current through the motor.

In carrying out my invention, and referring to the diagrammatic view in Fig. 2, A— A'— A², &c., represent a group of elevators; B, an electric motor, there being one for each elevator.

C is a storage battery.

D represents the electric circuit through which the current from a generator at some point E is conveyed to the electric motors and to the storage battery.

F represents the automatic current severing switch actuated by the sag of a slack hoisting or counterweight cable.

G — G' represent respectively the mechanism for stopping the elevator at the top and bottom of its travel by automatically severing the motor circuit.

H represents the electric brake which is held out of action when the current is on the motor, but is instantly brought into action to stop the driven shaft whenever for any reason the circuit of the motor is severed or the current interrupted through the motor.

I represents the switch mechanism for manipulating the operative current of the motor through the medium of the hand lever in the car.

The parts C, F, G, G', H and I are duplicated for each separate elevator, and are simply shown here in diagrammatic form to make more clear the community of action of the entire system.

The feature of my invention here illustrated may be described as follows: Current coming from the generator at E passes directly to the motors of the elevators A— A'— A²— A³, and supplies the said motors with operative current. In practice, however, each elevator is not traveling during a considerable portion of the time, as, for instance, while standing at the top or bottom of the well, or at different floors. Again, it frequently travels with a very light load, and if the mechanism is designed to use the electric current only in proportion to the load that is being carried, it would during such periods use but a limited amount. During all such periods, any excess of current over the line D would pass to the storage battery C, and charging the same, would be stored for use whenever the combined requirements of the several elevators would be in excess of the direct current from the generator E. In this way, with all excess of current from the generator being constantly stored into the storage battery, the elevators are made in a great degree independent of the generator or the engine which is driving the generator; so that should either the engine or the generator be out of order for a greater of less time, the effect would not be apparent at the elevators, since during those periods the energy would be supplied by the storage battery. The elevators would therefore be enabled to run without interruption regardless of occasional interruptions by the stoppage of the engine or the derangement of the generator or conducting wires leading to the storage battery. This is especially important when the generator is located at a central station or at any point a considerable distance from the elevators, where interruptions of various kinds are apt to occur upon the outside circuits. It also makes the elevator independent of the speed of the generator, which might vary with variations in the boiler pressure or for other reasons.

Proceeding now to other parts of my invention, J in the different figures represents the winding drum, J' the elevator hoisting cable, and J² the cable of the counterweight J³.

Now, referring to Fig. 1, the electric motor B is through a friction clutch K engaged with the driven shaft L, which in turn through suitable worm gear or other mechanism is engaged with the hoisting drum J.

M is a shaft which constitutes the shaft or pivot of a switch M'.

$m$ represents two levers, shown in plan in Fig. 1, and in elevation in Fig. 13, which are adapted as the shaft or pivot is rocked to connect with the terminals $m'$ or $m^2$, according as it is rocked in one direction or the other; the electric circuits illustrated by dotted lines in Figs. 1 and 2 being so arranged that by engaging the terminals $m'$ the current is directed through the motor in a direction to cause the elevator to ascend, while by engaging the terminals $m^2$ the current is reversed through the motor, causing the elevator to descend; while a position intermediate of these terminals would sever the circuit through the motor, or deflect the same so as to cause the elevator to stop.

$M^2$—$M^2$ represent pulleys upon a cross bar $M^3$, which latter is rigidly connected with shaft M.

N—N' in Fig. 12 represent two cables, both connected with the top of the car, passing thence upward to the top of the well over pulleys $M^4$, thence downward to the bottom of the well and about the pulleys $M^2$, thence upward to the car where they are connected to opposite extremities of a cross bar P' connected with the hand lever P in the elevator car. It is now apparent that by pushing the hand lever in one direction, one of the cables N is shortened up, while the other cable N' is lengthened out, thus tilting the shaft M and so operating the switch M' shown in Fig. 1; while a movement of the hand lever in the opposite direction reverses the switch and the current of the motor; while an intermediate position of the lever stops the car as before explained. It is thus seen that none of the electric circuits are trained to or into the elevator car, while on the other hand the operator in the car, through the medium of the lever P has complete control of the motor and its operative current.

Now, referring to Figs. 3 and 4, Q represents a lever pivoted at $q$, shown also in plan in Fig. 1. At $q'$ a cross arm extends across the winding drum J closely beneath the level of the cables wound thereon. At $q^2$ is a weight.

$q^3$ is a plunger, and $q^4$ is a notch in the plunger engaging the weighted end of the lever Q, by which the plunger is held in a fixed position. At the extremity of this plunger is an insulated contact piece $q^5$, which makes electrical connection with the terminal $q^6$, shown also in Fig. 1.

$q^7$ is a spring or yielding element which permits the contact piece $q^5$ to bear firmly under all circumstances against terminal $q^6$. If, however, the end $q'$ of the lever Q is depressed, it lifts the weighted end of the lever out of engagement with the notch $q^4$, and a spring $q^8$ instantly retracts the plunger $q^3$ and breaks the connection between $q^5$ and $q^6$.

Now, suppose that for any reason the elevator on its descent should be accidentally stopped, as, for instance, by something projecting from some floor beneath it into the elevator well, or by a workman's step-ladder near the base of the well, or by the accidental catching upon the side of the well of some object that is being carried by the elevator,—the result is that the hoisting cable J' Figs. 3, 4 and 20, would be slackened and would sag at the winding drum, as shown in Fig. 4. This would instantly depress the lever Q, and as above explained break the motor circuit at $q^6$. The same thing exactly would happen should the counterweight $J^3$ be for any reason caught or stopped on its downward movement. It would slacken the cable $J^2$, and so effect the breaking of the circuit at $q^6$.

R, Figs. 1, 5, 7 and 8 represents the brake strap of a friction brake.

R' is a lever weighted with an adjustable weight $R^2$, which may be located to afford any desired degree of friction. This lever is pivoted at $r$, and the strap R is engaged at its opposite ends close to said pivot, but upon opposite sides thereof, at $r'$ and $r^2$. It is thus apparent that whenever the lever R' is released so as to act under the influence of the weight $R^2$, the strap R will operate as a powerful brake to quickly stop the motion of the driven shaft L.

$R^3$ is a helix through which the operative current of the motor is directed, and when the current is passing through it, it operates by magnetism to lift and hold the lever R', thus permitting the shaft L to turn freely within the strap. If for any reason, however, the circuit is broken or interrupted, the magnet $R^3$ is destroyed, the lever drops, and the brake is instantly set; and so it is that wherever the hoisting cable or counterweight cable is slackened as above explained, and the motor circuit broken at $q^6$, the electric clutch K is disengaged and the magnetism of the magnet $R^3$ is destroyed, thus setting the brake R and instantly stopping the momentum of the driven shaft. The elevator is therefore immediately stopped without being carried by the momentum of the motor shaft beyond the position at which the difficulty has occurred, a difficulty experienced where the shaft is not severed as in my apparatus.

I will now describe the mechanism for automatically stopping the elevator at the upper or lower end of its travel.

$j$ represents a threaded extension of the shaft of the winding drum J.

S is a nut adapted to travel along the shaft as it is turned in either direction. S' is an upright rising from the said nut, and $S^2$ a connecting bar engaging the top of the said arm or upright with the top of the corresponding arm or upright $S^3$ on the shaft M, Fig. 1, which operates the switch M'.

$S^4$ and $S^5$ represent two arms or projections from the nut S.

$S^6$ is a tilting switch in the nature of a bell crank engaging a terminal $S^7$, both being in the motor circuit. $S^8$ is a yielding detent adapted to engage said switch lever. The detent, when the switch is engaged with the terminal, as shown in Fig. 15, rests a little beyond the switch pivot in a direction away from the terminal $S^7$, so that when the switch lever is engaged with the terminal, the spring $S^9$ operating through the detent holds the switch lever in a position of stable equilibrium. On the other hand, should the projection $S^4$ or $S^5$ on the nut strike the switch lever, it would immediately, by pushing the lever, carry the detent to the opposite side of the switch pivot, thus destroying the equilibrium, when the switch would be instantly opened wide by the upward pressure of the detent, as shown in Fig. 16, the detent being pivoted at its lower end to accommodate these movements. Of course any other equivalent construction might be employed at this point. Now, it will be observed that the arm $S^6$ of the left hand lever in Fig. 15 projects up around one side of the threaded shaft $j$, while the corresponding arm $S^6$ of the right hand switch lever projects up around the opposite side of the said shaft. The two arms are shown in elevation in Fig. 17. It is therefore apparent that when the arm S' which projects up from the traveling nut is forced in one direction, as, for instance, in Fig. 17, the projection $S^5$ will engage the arm of the left hand switch, thus opening the circuit; or if the nut were moving in the opposite direction, it would in like manner open the right hand switch. It will be observed, however, that upon the said nut is a cam shaped projection $S^{10}$, and if the arm S' of the traveling nut is forced into a vertical position, this cam, by engaging the horizontal portion of the switch $S^6$, will again force it into connection with its terminal, and restore the circuit through the motor. It is apparent that this opening of either switch by the traveling nut will only occur at the end of its travel, and the horizontal arm of the switch will be thereby raised so that as the operator, finding he has opened the switch, raises the lever to the upright position, the cam projection $S^{10}$ strikes this raised arm and forces it down and closes the circuit. The operation of this part of the mechanism will now be understood. The operator upon the elevator car, through the hand lever P and the shaft M, actuates the switch M', and at the same time, as shown in Figs. 13 and 14, he changes in a corresponding degree the position of the upright S' of the traveling nut, and so brings the projection $S^5$ or the projection $S^4$, as the case may be, into position to engage one or the other of the said switch levers $S^6$ shown in Fig. 15. The nut S is given such a position upon the threaded shaft $j$ that when the elevator reaches the upper end of its travel, one of the projections, as, for instance, $S^4$, will engage—say the right hand switch, and break the motor circuit as explained, this break of the motor circuit, as hereinbefore described, serving at once to release the electrical clutch between the motor and the driven shaft, and also to set the brake R. The operator may then bring his lever to the middle position, or that position which would naturally stop the elevator and which opens the switch $m'$, shown in Fig. 1. By doing so, he brings the projection $S^{10}$, Fig. 17, into contact with the switch lever $S^6$, and restores the circuit at this point. Now, if he should through carelessness or otherwise turn his lever into position to ascend the shaft farther, he would by forcing his lever in that direction again instantly open the switch $S^6$, thus breaking his circuit and leaving the car motionless. It is therefore impossible for him by any faulty manipulation of his lever to cause the car to ascend to any greater altitude than the top floor or the uppermost point of its proper travel. He might, however, reverse his lever. In doing so, he restores the circuit of the switch $S^6$, as above explained, and the car starts on its downward travel. As it descends, the nut S travels to the opposite end of the threaded extension $j$ until at the bottom of its travel, or at the bottom of the elevator shaft, it comes into contact with the other, as for instance, the right hand switch, when the circuit is again automatically opened, as above explained, and the car stops. At this point, any attempt by the operator through carelessness or otherwise, to cause the car to descend farther, would manipulate this switch $S^6$ in like manner as above explained, and leave the car motionless.

I will now describe the electric clutch mechanism whereby the motor shaft is engaged with the driven shaft.

Referring to Figs. 5 and 8, C' is the motor shaft and L the driven shaft. Upon the extremity of the motor shaft is keyed a cylindrical head K, having wound about it a coil K' forming a part of the motor circuit. Upon the driven shaft is keyed a disk or head $K^2$, upon which the brake band R is sleeved. Upon the interior of the cylinder K are depending flanges or corrugations $k$, which may be of any form, although I prefer that they shall be substantially in the form of cogs, as shown in Fig. 6, since this form is convenient in the manufacture of the friction plates which are to engage therewith. Upon the exterior of the hub of the head or disk $K^2$ are similar flanges or corrugations $k'$.

$k^2$ represents a series of plates illustrated in Fig. 10 which are engaged to slide loosely lengthwise of the corrugations $k$; and $k^3$ are plates of like construction shown in Fig. 11 adapted to slide loosely along the flanges or corrugations $k'$. One of the sets of plates $k^2$ or $k^3$, as, for instance, the plates $k^3$, are made preferably of soft iron, so as to be attracted in one direction or the other either toward the head K or the head $K^2$, according as the current may be passing in one direction or the other toward the coil K'. The other set of plates $k^2$ may in like manner be of soft iron, or of fiber, or of brass or other metal. In practice, I think I would prefer that one set of plates be made of soft iron, and the other set of plate brass or similar non-magnetic material.

$K^3$ represents a little spud or plunger with its end pressing centrally against the end of the motor shaft, the object being when current is off from the motor to shift the motor shaft slightly in a longitudinal direction so as to relieve the friction between the plates $k^2$—$k^3$, and to throw the armature of the motor a little out of its normal plane in the magnetic field.

The operation of this friction clutch mechanism is as follows: As soon as the operative current is directed through the motor the armature begins to revolve, and acquires considerable velocity before the magnetic field is fully established. As soon as the magnetic field is fully established, the armature will endeavor to assume its normal position within the magnetic field, and in this effort shifts its shaft longitudinally toward the driven shaft, thus bringing into frictional contact the disks or plates $k^2$—$k^3$. Now, as the plates $k^2$ are engaged with the cylindrical head K, and the plates $k^3$ are engaged with the driven shaft, it is apparent that the frictional engagement between them will cause the driven shaft to gradually take up the motion imparted by the motor shaft until eventually they move in unison. At the same time, the coil K', being also in the motor circuit, magnetizes the portions $k^4$—$k^5$ of the cylindrical head K, and the portion $k^6$ of the head $K^2$. The soft iron plates are therefore attracted longitudinally of the shaft as the electric current in the coil K is passing in one direction or the other; and so the magnetism developed in these heads and the soft iron plates serves to very materially increase the frictional engagement. At the same time, the portions $k^5$ and $k^6$ will be corespondingly attracted toward each other, thus increasing the frictional engagement of the plates, all the plates shifting freely longitudinally of the shafts along the flanges or corrugations $k$—$k'$. Then, when the current is interrupted for any reason hereinbefore explained, or by the operator through the manipulation of his lever P, the magnetism in the frictional clutch is at once destroyed, the frictional engagement lets loose, and the spring spud $K^3$ forces the motor shaft slightly in a longitudinal direction, again restoring all the parts to their normal position with the current off, and the elevator is at rest.

This portion of my device last described admits of some variation. Thus, for instance, as shown in Fig. 8, the coil shown in Fig. 5 at K' may be omitted and dependence be had for bringing the friction clutch into engagement on the effort of the motor armature to assume its normal place in the magnetic field when the motor is in motion.

In Fig. 21 I show a variation in my apparatus for breaking the circuit whenever the cable of the elevator or its counterweight is slackened. It is here shown as applied, not to a hoisting drum, but to that kind of hoisting apparatus where the cable passes around two sets of pulleys, which pulleys are by the motive power drawn apart to hoist the elevator brought together for causing it to descend. The principle is precisely the same, and a slack cable on this kind of apparatus would operate precisely the same as upon a winding drum. It is illustrated simply to show that this feature of my invention is applicable alike to the different varieties of hoisting gear.

This apparatus of mine is not limited in its employment to any particular kind of electric motor. I prefer, however to employ a motor in which there are several windings upon its fields, so that the operative current may be directed through enough only of the several windings to lift the load at any time, and by thus dispensing with the resistance which the current would necessarily meet in traveling through a larger number of windings, saving this unnecessary energy for use with the other elevators, or permitting it to be stored in the storage battery.

I do not illustrate a motor of the character I name, because the motor itself constitutes no part of my invention. In Fig. 2, however, I show simply a series of such field circuits leading to the motor B from the diagrammatic representation of the switches, and in Figs. 18 and 19 I illustrate my switch M' when designed to accomplish the purpose of directing the current through one or more sets of windings as indicated by said circuits. This will also be better understood by referring to Fig. 1. We may presume the left hand terminal $m^2$ to be a single continuous terminal as shown in Fig. 18; as also the right hand terminal $m'$; while the left hand terminal $m'$, shown in Fig. 1 may be divided into several segments $m'$, $m^3$, $m^4$, $m^5$, as also the right hand terminal $m^2$, each one of which segments would direct the current through a particular winding upon the fields of the motor. The contact piece $m^6$, however, on the switch is of a size sufficient to engage them all simultaneously if desired, so that current on the circuit $t$ in Fig. 1 may pass thence to one of the switch levers $m$, and presuming the switch levers to be tilted into contact with the terminals $m'$, the current will pass thence to the left hand terminal $m'$, thence across to the right hand terminal $m^2$, thence off through $t'$ to the motor, thence back through $t^2$ to the left hand terminal $m^2$, thence across to the right hand terminal $m'$ through its switch lever $m$, thence by $t^3$ off to the generator; and by pressing the switch lever into engagement with more or less of the segments $m'$—$m^3$—$m^4$, &c., as shown in Fig. 18, the current may be directed through one or any desired number of the said windings on the fields of the motor.

The counterweight $J^3$ on other elevators is usually somewhat less than enough to counterbalance the weight of the elevator, so that the elevator having been hoisted will descend by gravity. In all such elevators, however, it is manifest that in addition to hoisting this preponderance of weight on the part of the elevator, the power must also lift whatever load the elevator carries up. This requires a very considerable power, and if each electric motor were required to be of sufficient capacity to lift the said preponderance together with the load, the motors would necessarily have to be so large as to consume the energy developed by a larger dynamo or generator, and it would be practically impossible to locate a group of elevators, each provided with electric motors upon the same circuit. I purpose, however, to make the weight $J^3$ considerably greater than that of the elevator, and in practice I prefer that it shall equal about the weight of the elevator car, and in addition thereto, about one half of its maximum load. It is now apparent that if the elevator is ascending empty, it will ascend by the gravity of the weight without the expenditure of any power upon the part of the motor. On the other hand, if it is loaded to its maximum capacity, the motor is only called upon to raise a load equal to one half that maximum load upon the elevator, the weight serving to lift the elevator and the other half of the said load. Now, in descending, if the elevator has but an average load, or a load—say of one half its maximum capacity, it will be just about counterpoised by the counterweight, so that the motor is called upon simply to move the elevator downward without exercising any considerable energy; or if the car on its downward travel is empty, the motor is only called upon to exercise sufficient energy to pull down or hoist what would be equivalent to this maximum load without the weight of the elevator itself. Thus, if we assume that the maximum load of the elevator is a thousand pounds the motor would never be required to develop any more energy than that necessary to lift or pull down five hundred pounds. In this way I am enabled to operate the elevator at full capacity with considerably less than half the energy that is required to operate an elevator with the same load under the usual conditions. This results in enabling me to employ a motor of much less capacity for each elevator, and consequently enables me to employ a number of such motors, one for each of a group of elevators without going beyond the capacity as now commercially constructed and used, and upon a single circuit. This feature I regard as of very great importance, since in addition to the foregoing, it brings the power requisite for a group of elevators within the limits of an ordinary engine necessary to run a single elevator; and in practice the power required in a motor to run an elevator by my system is only about two fifths that which was required for an elevator of like capacity by former systems. Again, it will be observed that the counterweight cable winds upon the hoisting drum as the hoisting cable is wound off therefrom and vice versa; and it is this feature of counterbalancing from the winding drum itself which renders practicable the feature of employing a counterweight much heavier than the car itself, for if such a counterweight were connected in the usual way to the top of the car, the car would be constantly lifted by the said weight and could never descend by its gravity, except when the aggregate weight of the car and its load exceeded that of the counterweight; whereas, by my method the car may descend when empty by its own gravity whenever the motion of the winding drum is reversed by the driving power.

I have shown in the drawings and described in this specification only the hand lever mechanism P for operating the switch which governs the motor current. I do not limit myself to this particular construction. It is convenient and practicable, but I would have it understood that instead thereof, I may employ any suitable mechanism for operating the said switch from the car, and especially any of those devices common in hydraulic and steam elevators for turning on or cutting off the motive power.

What I claim is—

1. In combination with an elevator car and a motor arranged to operate the same, a switch arm operating to change the direction of the current admitted to the motor, a pair of cables forming with the car a loop or circuit extending from top to bottom of the elevator well, a rock-arm operating the said switch and itself rocked by relative movement of said cables, and a rock-arm on the car receiving the ends of said cables and adapted to move them relatively the one to the other, substantially as and for the purpose described.

2. In an electric elevator, the combination of a pivoted switch, a traveling trip adapted to move said switch; a spring pressure arm bearing against said switch at a point out of line with the line connecting the pivot of said switch and the point of support of the pressure arm, and arranged to be thrown from one side to the other of said connecting line, as the switch is turned on its pivot by said traveling trip, substantially as and for the purpose described.

3. In an electric elevator, the combination of a traveling trip arranged to rock on its carriage and provided with arms, a pivoted switch also provided with arms, the said switch being mounted in the path of the arms of said traveling trip, and mechanism substantially as described for producing the combined traveling and rocking motion of said trip, all combined and arranged as described.

4. The combination with hoisting gear of an elevator, of an electric motor for operating the same, and a friction clutch for engaging the motor with said hoisting gear, said clutch consisting of the combination with the motor shaft and the driven shaft, of a series of disks $k^2$, $k^3$, each alternate disk engaged with the motor shaft and the others with the shaft to be driven, and all adapted to move freely in a direction longitudinal of said shafts, and means whereby the motor current is caused to thrust one of said shafts longitudinally toward the other, substantially as described.

5. In combination with the driving and driven shaft to an elevator, a friction clutch composed of a solenoid and a number of magnetic disks forming an electro-magnet therein and an external cylinder said disks being arranged to move longitudinally along the axis of one of said shafts, and to hold alternately to one of said shafts and to said external cylinder, extending from the other of said shafts around the said disks, substantially as and for the purpose described.

6. In combination with a driving shaft, a driven shaft a cylinder surrounded by a solenoid forming the end of one of said shafts, a longitudinally movable extension from the end of the other of the said shafts concentric to and lying within the said cylinder, a compound core composed of perforated disks of magnetic material located within said cylinder upon said extension, the said disks being of different radii and arranged with a large and a small disk in alternation, the small disk movable longitudinally along but turning with said extension, the large disk moving longitudinally along and turning with the cylinders, the said compound core being normally held longitudinally out of center with the magnetic field of said solenoid, but adapted to be moved under magnetic force toward said center whereby said disks are adapted to be brought into strong frictional and magnetic contact, substantially as and for the purpose described.

7. In a magnetic friction clutch, the combination of a driving and a driven shaft, disks of magnetic material surrounding one of said parts, a cylinder extending from the other of said parts within which are received the said disks of magnetic material, a portion of said disks engaging the cylinder, and a portion of said disks engaging the shaft within the cylinder, and all of said disks movable longitudinally along both shaft and cylinder, a solenoid surrounding said cylinder, and a spring actuated plunger, operating to push the compound core, formed by said disks, out of center with the field center of said coil.

8. The combination with an electric switch, and spring actuated detent arranged to hold said switch, in either an open or closed position, a traveling trip arranged to rock on its carriage, arms extending from said trip adapted to open said switch when rocked while in its traveling movement to position to effect that result, and to close said switch when rocked in the reverse direction at the end of its course, substantially as and for the purpose described.

9. The combination of an electric motor, a shaft driven thereby, a rock-shaft and arms adapted to reverse the current through said motor by opening a switch on one side and closing it on the other and a traveling rocking trip, moved by said driven shaft and arranged to break the electric circuit at definite points in its travel, substantially as and for the purpose described.

10. The slack cable mechanism for cutting off or opening the motor circuit, the same consisting of a pivoted lever or frame Q, $q$, spring plunger $q^3$ insulated contact piece $q^5$, said lever or frame being adapted to engage the spring plunger and to be released therefrom by the sag of a slack cable, substantially as and for the purpose described.

11. The combination with an elevator, hoisting cables, and an electric motor adapted to actuate its hoisting mechanism, of a cut-out switch on the motor circuit constructed to wholly cut off the current from the motor and a trip for operating the cut out, said trip projecting closely beneath the elevator cable or cables and adapted to be actuated by the sag of any said cable or cables, should the same become slack, substantially as described.

12. The combination with an elevator, a counterweight, a cable, and an electric motor adapted to operate the hoisting gear of the elevator, of a cut out switch placed adjacent to and adapted to be actuated by the sag of said cable should it become slackened, said switch constructed to wholly cut off the current from the motor, and to restore the connection automatically when pressure is removed, substantially as described.

13. The combination with an elevator and electric motor for operating the same, of a lever P located on the car, pulleys $M^2$, $M^4$, a connecting bar or frame $M^3$, and a stationary switch actuating shaft M engaged with said bar or frame, said shaft M adapted as it is rocked to impart the proper motions necessary to manipulate the current of the motor whereby the elevator may be moved in either direction or stopped at the will of the operator, substantially as described.

14. The combination with the hoisting gear of an elevator, of an electric motor for operating the same and a friction clutch for engaging the motor with said hoisting gear, said clutch consisting of the combination with the motor shaft and the driven shaft, of a series of disks $k^2$ $k^3$, each alternate gear engaged with the motor shaft, and the others with the shaft to be driven, and all adapted to move freely in a direction longitudinal of said shafts, and means whereby the motor current is caused by magnetic attraction exerted longitudinally of the motor shaft to thrust one of said shafts longitudinally toward the other, substantially as and for the purposes described.

15. The slack cable mechanism for cutting off or opening the motor circuit, the same consisting of a pivoted lever or frame Q, $q$, spring plunger $q^3$, and insulated contact piece $q^5$, said lever or frame adapted to engage the spring plunger and to be released therefrom by the sag of a slack cable, substantially as and for the purposes described.

In testimony whereof I hereby sign this specification in the presence of two witnesses.

GEO. H. REYNOLDS.

Witnesses:
M. A. REEVE,
WELLS W. LEGGETT.